(12) United States Patent
Robinson

(10) Patent No.: US 6,599,064 B1
(45) Date of Patent: Jul. 29, 2003

(54) COMBINED DOWEL-HOLE AND POCKET-HOLE DRILLING APPARATUS

(76) Inventor: Jeffery A Robinson, 37 Long Hill Rd., Groton, MA (US) 01450

( * ) Notice: Subject to any disclaimer, the term of this patent is extended or adjusted under 35 U.S.C. 154(b) by 0 days.

(21) Appl. No.: 10/189,905

(22) Filed: Jul. 3, 2002

(51) Int. Cl.[7] ............................................... B23B 47/28
(52) U.S. Cl. ................................... 408/110; 408/115 R
(58) Field of Search ................................ 408/110, 111, 408/109, 115 R, 112, 113, 712

(56) References Cited

U.S. PATENT DOCUMENTS

| | | | | |
|---|---|---|---|---|
| 2,849,900 A | * | 9/1958 | Heidtman, Jr. | 408/111 |
| 2,953,045 A | * | 9/1960 | Carles | 408/110 |
| 3,086,408 A | * | 4/1963 | Donals | 408/115 R |
| 3,100,408 A | * | 8/1963 | Pufahl | 408/110 |
| 3,534,639 A | * | 10/1970 | Treichler | 408/111 |
| 3,626,513 A | * | 12/1971 | Pytlak | 408/115 R |
| 3,890,058 A | * | 6/1975 | Self et al. | 408/112 |
| 4,199,283 A | * | 4/1980 | Perry | 408/115 R |
| 4,492,498 A | * | 1/1985 | Kaufman | 408/115 R |
| 4,865,496 A | * | 9/1989 | Challis | 408/115 R |
| 5,150,993 A | * | 9/1992 | Miller | 408/110 |
| 5,676,500 A | * | 10/1997 | Summerfeld | 408/103 |
| 5,791,835 A | * | 8/1998 | Chiang et al. | 408/115 R |

* cited by examiner

Primary Examiner—Daniel W. Howell
(74) Attorney, Agent, or Firm—Robert Nathans

(57) ABSTRACT

A combination dowel-hole and pocket-hole drill comprising a motor/handle assembly, a pivoting platform, a fence system, and a base assembly. The motor/handle assembly includes a shoe structure enabling the motor/handle assembly to slide along grooves in the pivoting platform. The pivoting platform can be set at various angles to the base advantageous to either drilling a dowel hole or drilling a pocket hole. An adjustable stop rod on the pivoting platform sets the depth of plunge for drilling operations. The fence system consists of an upper fence primarily used for dowel hole drilling operations and a lower fence primarily used for pocket hole drilling operations. The upper fence slides perpendicular to the cutting tool and sets the distance of the dowel hole from the top surface of the workpiece. The lower fence slides parallel to the base assembly and sets the entry point for the pocket hole drill bit. This entry point is determined by the workpiece thickness. A guide bushing is provided to prevent vertical and lateral movement of the pocket hole drill bit during pocket hole drilling operations.

22 Claims, 14 Drawing Sheets

COMBINED DOWEL-HOLE AND POCKET-HOLE DRILLING APPARATUS

BACKGROUND OF THE INVENTION

The present invention relates to an apparatus for drilling holes, and more particularly, for drilling dowel holes for joining one workpiece to another using, for example, dowels, and for drilling pocket holes for fastening one workpiece to another using, for example, screws.

Traditionally, the drilling of dowel holes and pocket holes has been accomplished with either a jig or a large piece of machinery. The jig, while economical, is time-consuming to set up and use, and often lacks accuracy. Large machinery is suitable for large production job shops but is too expensive and too bulky for a carpenter, a small job shop, or a do-it-yourself woodworker. The invention disclosed addresses the needs of, although not limited to, the carpenter, small job shop, or do-it-yourself woodworker.

Dowel joinery is a very old process and some attempts have been made to mechanize the creation of the dowel hole with limited success. One example of a jig to hold the workpiece appears in U.S. Pat. No. 4,594,032. This jig clamps to the workpiece, possibly causing damage to softer woods, and allows for a very limited number of dowel sizes and workpiece thicknesses. Another example of a jig that holds the workpiece and a powered drill appears in U.S. Pat. No. 4,235,565. This jig is time-consuming to set up for each change of workpiece thickness and requires that it be attached to a bench or table before using it. The present invention does not clamp to the workpiece, so has little chance of damaging it, will support any standard or custom size dowel up to about one inch in diameter, and any workpiece thickness. The present invention is hand-held and portable, so it is easily moved from one drilling operation to the next.

Pocket-hole joinery is a more recent process (reference U.S. Pat. No. 3,496,974) and the jigs developed have mirrored those of the dowel joinery process. One example of a jig to guide a stepped drill bit appears in U.S Pat. No. 5,781,835. The workpiece is clamped in the jig, which can possibly damage the workpiece, the thickness of the workpiece is limited, and it is awkward to use with large workpieces. An example of a powered tool that mechanizes part of the process appears in U.S. Pat. No. 5,375,636. It is a semi-production machine that, in the preferred embodiment, is meant to be mounted to a bench or table. It addresses many of the drawbacks of a jig, but still requires a separate powered hand drill to make the pilot hole cut. The present invention does not clamp to the workpiece, so has little chance of damaging it, and will handle workpieces from about one-half inch to about one and one-half inches thick. The preferred embodiment of the present invention cuts both the bore and pilot hole in one operation and doesn't require any additional steps or equipment to cut a pocket hole.

There is prior art for jigs that guide a drill bit and jigs that guide a portable hand drill, but a dedicated, hand-held, portable, powered drill for creating dowel holes does not currently exist. Similarly, there is prior art for jigs that guide a stepped, pocket-hole drill bit and large, production-sized machines for creating pocket holes, but a dedicated, hand-held,, portable, powered drill for creating pocket holes does not currently exist. The present invention performs the task of drilling both dowel holes and pocket holes and provides the accuracy, versatility, and convenience of use that users desire.

The idea for the present invention came about after building a slatted table top with breadboard ends. The slats were narrow, so each slat had to be joined to the breadboard ends with a dowel joint. The holes for the dowels had to be precisely placed so that all of the workpieces were coplanar once the joints were assembled. This required the use of a doweling jig. The jig was supposed to clamp to the end of the board and guide the drill bit, but because the slats were so narrow, the jig kept slipping off the workpiece making the dowel holes difficult to cut. I envisioned a device somewhat similar to a biscuit cutter or plate jointer, as disclosed in U.S. Pat. No. 4,913,204 to Moores et al., such that a fence would be used to position the device to the workpiece and a plunging motion of the motor and drill bit with respect to the base and fence assembly would produce an accurate dowel hole. However, such a dedicated device would not be economically feasible.

Another project brought up the need to join several workpieces together using a pocket-hole joint. Again, this required a jig to hold the workpiece while the user drilled pocket holes in the workpiece. The choices were either inexpensive jigs that required a lot of setup for each pocket hole, or a relatively expensive jig that reduced the setup time somewhat. Both had the same drawback, as does the doweling jig, that the jig needed to be clamped to the workpiece, which can mar softwoods.

The solution was to take my original idea and give it the ability to drill oblique holes for pocket-hole joints. This device would be able to drill dowel holes quickly, accurately and with very little setup time and, by tilting the motor and drill bit assembly with respect to the base, would be able to drill pocket holes quickly, accurately and with very little setup time. Since my upper and lower fences rest against the workpiece without gripping, to cut either type of hole, it can't mar softwoods. My dual-purpose device is easy to move around the workshop, the workpiece can be brought to the device to cut the holes, or the device can be brought to the workpiece whether it's on the bench or at the work site. This combination dowel hole and pocket hole drill would be economically feasible.

Marring of softwood workpieces also can be produced by hold-down devices. Mastley patent, 6,374,878, utilizes such hold-down members that are "pressed against the workpiece to keep the workpiece from moving upward." (upon retraction of the drill after the hole is formed); see col. 3, lines 50–60. Such members can make undesirable indentations in soft woods, like the aforesaid gripping action. While Raines 4,842,453 does not require a workpiece clamp or mar producing hold-down device pushing against the softwood workpiece, the fixture holding the workpiece has to be held down to keep it from moving about during the drilling operation. The need to hold the fixture against a support table is eliminated by the present invention. Also, the support table 40 of Raines tilts back to accommodate thicker workpieces. Ideally, the angle of the workpiece to the pocket-hole drill bit should be around 15 degrees. By tilting the support table 40 back, the angle of the workpiece to the drill bit increases substantially. This increases the difficulty in keeping the two workpieces coplanar during assembly. This device was meant to work primarily with ¾ inch thick workpieces.

SUMMARY OF PREFERRED EMBODIMENTS OF THE INVENTION

The present invention provides a single apparatus enabling a user to drill accurate, repeatable dowel holes in an expeditious manner. Further, the present invention provides the ability to drill accurate, repeatable pocket holes in an expeditious manner with such a single apparatus without the need for the user to perform tedious, time consuming, error prone calculations.

An object of the present invention is to provide a portable hand-held drilling machine that is easily carried from place to place by the operator.

Another object of the present invention is to provide a simple and quick means to create a dowel-hole joint that can be secured with a wooden dowel.

Another object of the present invention is to provide a first fence for the purpose of accurate alignment and placement of the tool to the workpiece prior to drilling the dowel hole. A further object of the present invention is to provide an accurate graduated indicator for proper placement of the fence prior to drilling the dowel hole.

Another object of the present invention is to provide a simple and quick means to create a pocket-hole joint in addition to the dowel joint that can be secured with a mechanical fastener.

Another object of the present invention is to provide a second fence for the purpose of accurate alignment and placement of the tool to the workpiece prior to drilling the pocket hole. A further object of the present invention is to provide special scale markings to indicate proper placement of the second fence prior to drilling the pocket hole.

Another object of the present invention is to provide a means to restrict the location of the supporting structure in relation to the base and fence system with a repositionable device intended to physically abut the supporting structure. A further object of the present invention is to provide special scale markings to indicate proper placement of the repositionable device prior to drilling dowel holes or pocket holes.

Another object of the present invention is to provide a structure to support and rotate a drilling bit and to move that structure axially to the tool and in relation to the base and fence system.

Another object of the present invention is to provide a means to pivot the supporting structure in relation to the base and fence system to rapidly and easily accommodate the angle of the tool to the workpiece required for either a dowel-hole drilling operation or a pocket-hole drilling operation. A further object of the present invention is to provide structure to designate to the operator the proper angle of the pivotable supporting structure.

Another object of the present invention is to provide a machine with a tool-guiding jig to eliminate vertical and lateral movement of the tool during operation.

The currently most preferred apparatus embodying the invention, see FIG. 14, has a motorized drill 30 slidably coupled to a pivotable support platform 26 and movable along the platform for drilling a hole in a workpiece 108, the support platform being pivotably coupled to a base assembly. An adjustable travel limiting stop arrangement 28, 32, 36, after being manually set by the user automatically limits the degree of drill travel and hence the depth of the holes drilled. A clamping arrangement 54, 56, 58, FIG. 2, enables the user to selectively maintain the motorized drill parallel with respect to the base assembly 44 for drilling dowel holes or alternatively, for maintaining the drill at an appropriate angle that is about fifteen degrees with respect to the base for drilling pocket holes as indicated in FIGS. 1c and 1d.

For forming pocket-holes, a horizontally movable pocket hole workpiece positioning fence 66, FIG. 14, contacts at its inside surface a front side of the workpiece and holds it against the lower portion of the base assembly 44, and a pocket-hole depth establishing device includes a first manually adjustable workpiece thickness scale and pointer along with a second manually adjustable workpiece thickness scale and pointer. The first scale 42 and pointer, FIG. 10, is manually set by the user to the workpiece thickness to establish the proper depth of the pocket hole and the second scale 90 and pointer is also set by the user to the workpiece thickness to establish the proper position of entry of the drill near an edge portion of a workpiece (FIGS. 1c, 1d, and 14). Thus, if thin workpieces are to be joined, the drill entry will be close to the workpiece edge and the hole depth will be short to prevent a screw fastener from going all the way through the second workpiece, and conversely, if relatively thick workpieces are to be joined, the drill entry point will be further away from the workpiece edge and the hole depth will be much longer to accommodate a longer screw fastener. As a result, an adjustable pocket-hole parameter input mechanism is provided for drilling different sizes of pocket holes without the need for tedious, time consuming, error prone user calculations.

Additionally a vertically adjustable dowel-hole workpiece positioning fence 60, FIG. 7, is slidably coupled to the base assembly and clamped thereto, for precisely positioning the workpiece with respect to the movable drill, for proper location of dowel-holes within the workpiece.

Also, the support platform coupling device 46, 48, FIG. 11, is configured to quickly and easily uncouple the support platform from the base assembly when a pivot angle therebetween exceeds a predetermined value, for cleaning and maintenance of the drilling apparatus components.

BRIEF DESCRIPTIONS OF THE DRAWINGS

Other objects, features, and advantages of the present invention will become more fully apparent from reading the following detailed description of the preferred embodiment, accompanying drawings, and appended claims.

FIGS. 1a and 1b will aid in the understanding of how a prior art dowel joint is formed by a reader who may be unfamiliar with this art, while FIGS. 1c and 1d illustrate how a pocket-hole joint is formed.

DETAILED DESCRIPTION OF PREFERRED EMBODIMENTS OF THE INVENTION

Figure 1:
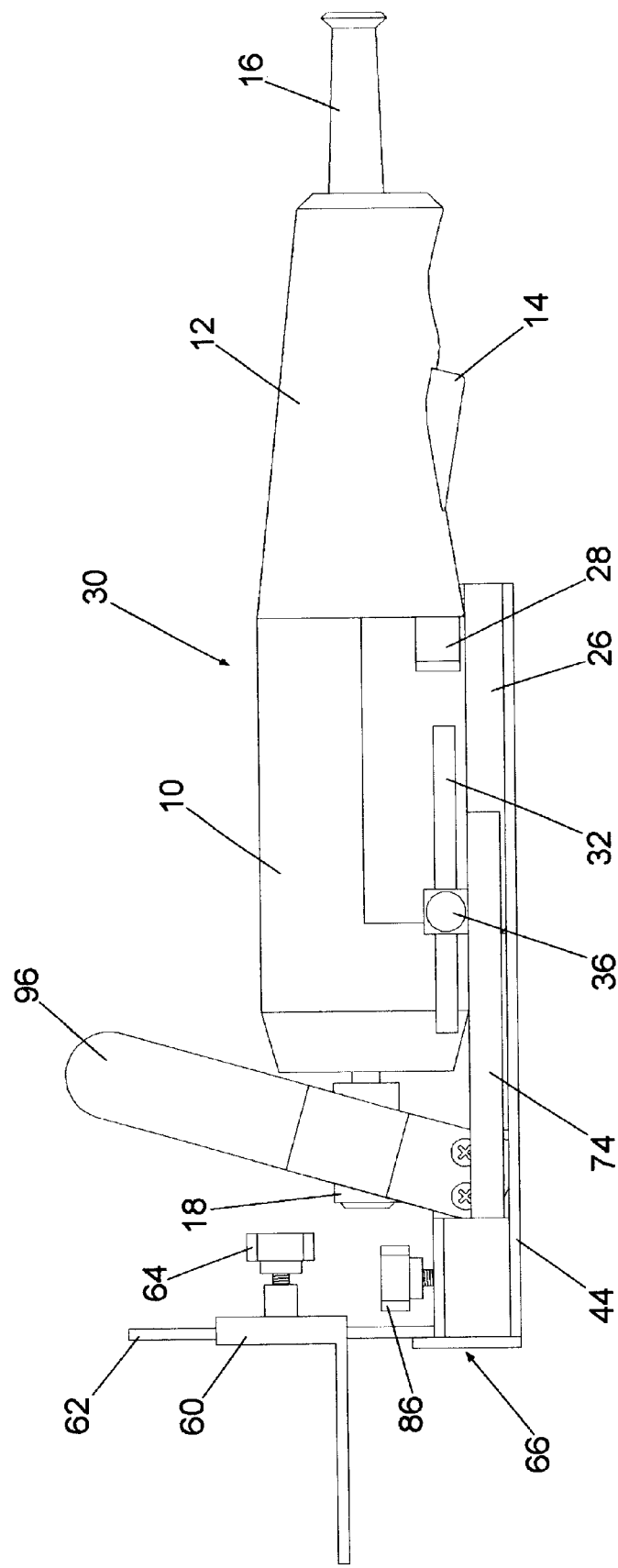
FIG. 1 is a left side elevation view of the combination dowel-hole and pocket-hole drill of an embodiment of the invention.
Figure 1B:
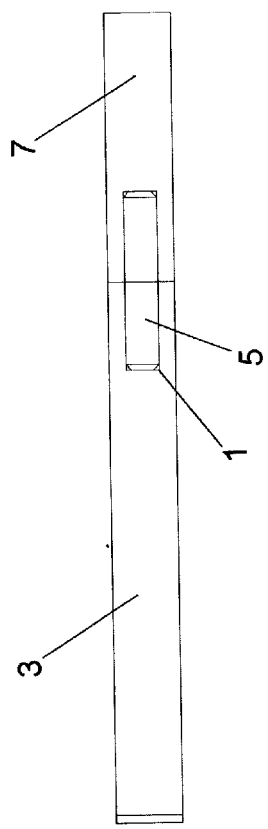
Figure 1A:
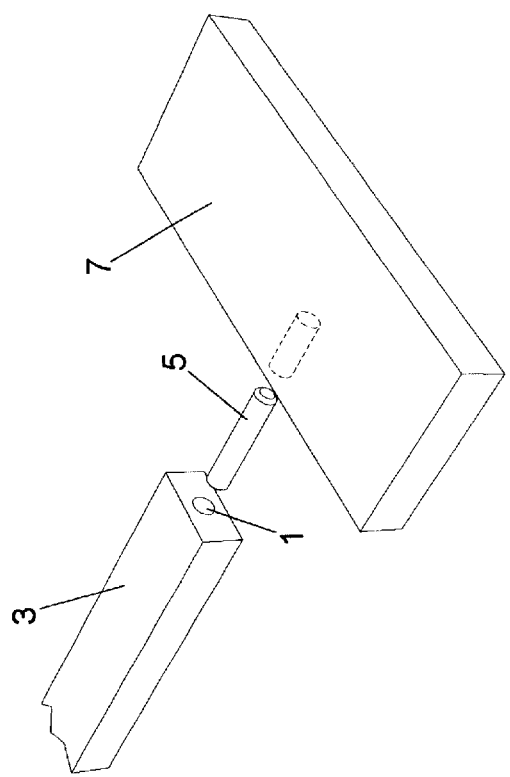
Figure 1D:
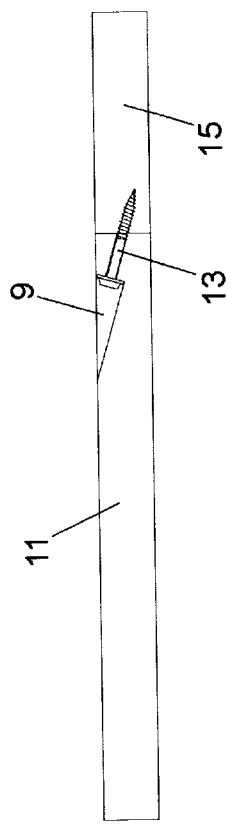
Figure 1C:
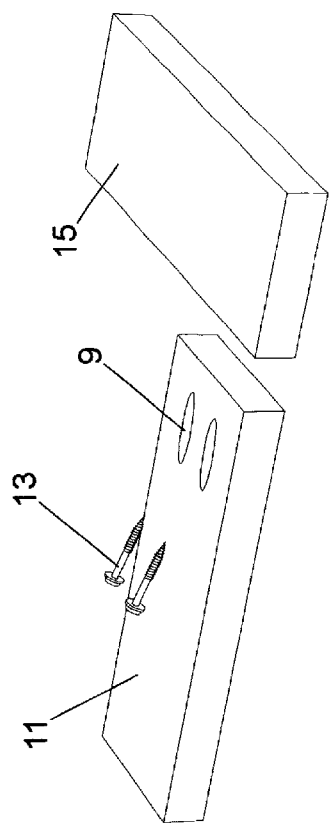

In accordance with well known techniques, and referring to FIGS. 1a and 1b, a dowel-hole drill is used to produce a hole 1 in a workpiece 3 such that a dowel 5 can be used to join that workpiece to another workpiece 7 in which a similar hole has been drilled. Also, a pocket-hole drill is used to produce a hole 9 in a workpiece 11 such that a fastener 13, typically a screw, can be used to join that workpiece to another workpiece 15 as shown in FIGS. 1c and 1d. The preferred embodiment of the combination dowel-hole and pocket-hole drill (the present invention) is shown in FIGS. 1 through 6 with additional detail provided in FIGS. 7 through 14.

Figure 7:
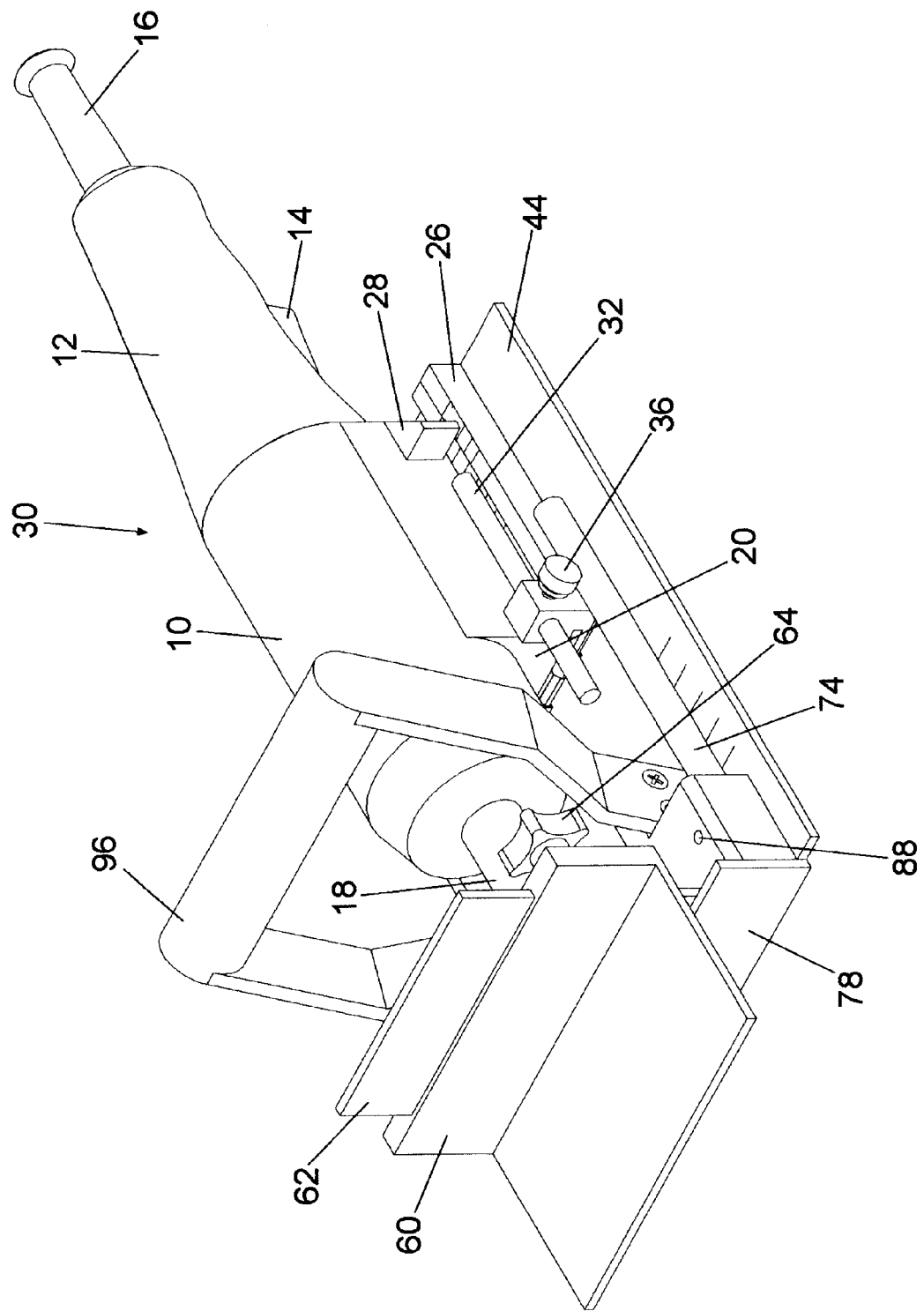
FIG. 7 is a top left perspective view of the combination dowel-hole and pocket-hole drill shown in FIG. 1.
Figure 8:
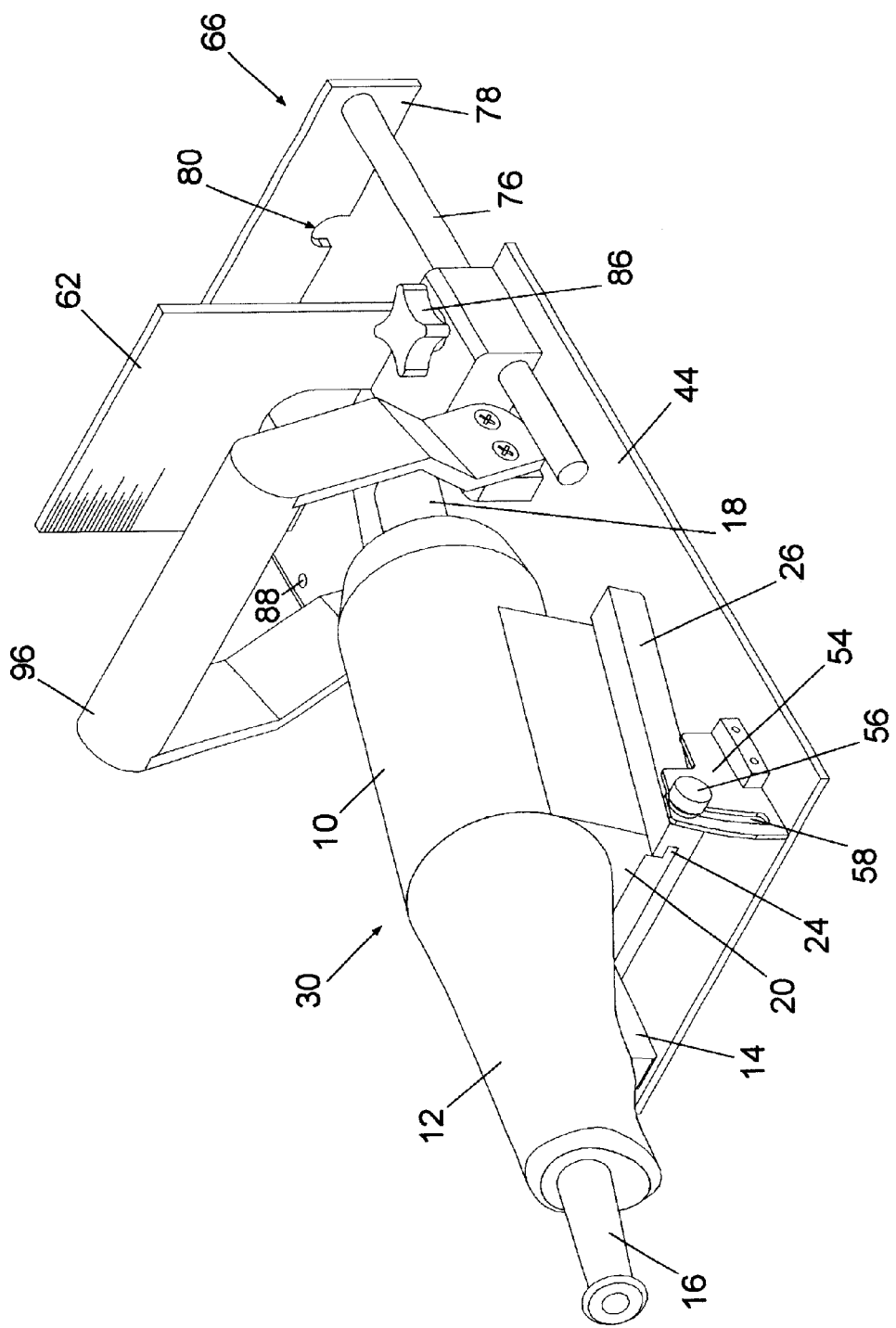
FIG. 8 is a top right perspective view of the combination dowel-hole and pocket-hole drill shown in FIG. 1 with the motorized portion of the tool in the pocket-hole position.

FIG. 7 illustrates the preferred setup of the machine for drilling dowel holes and FIG. 8 illustrates the preferred setup of the machine for drilling pocket holes.

Figure 6:
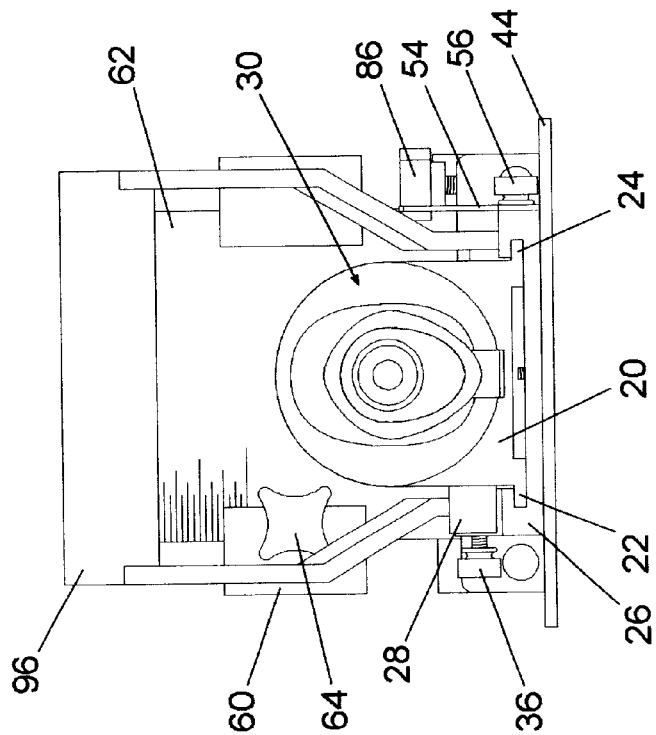
FIG. 6 is a back elevational view of the combination dowel-hole and pocket-hole drill shown in FIG. 1.
Figure 5:
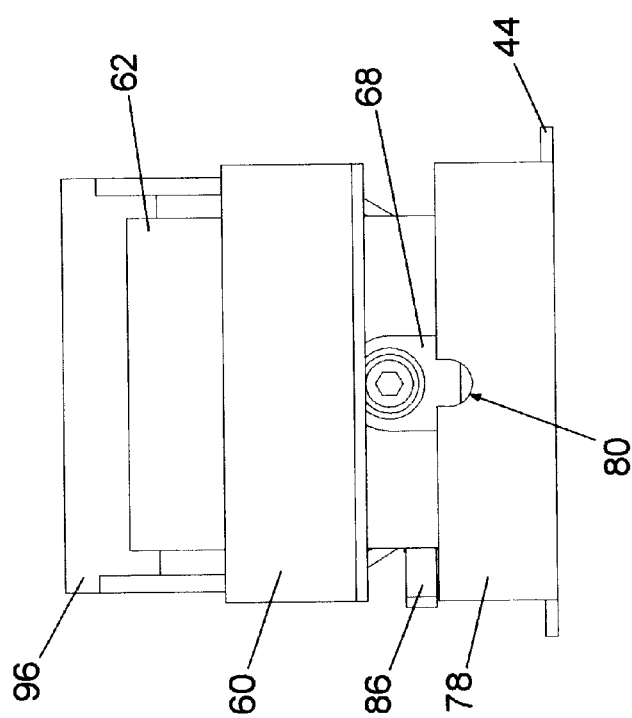
FIG. 5 is a front elevational view of the combination dowel-hole and pocket-hole drill shown in FIG. 1.
Figure 9:
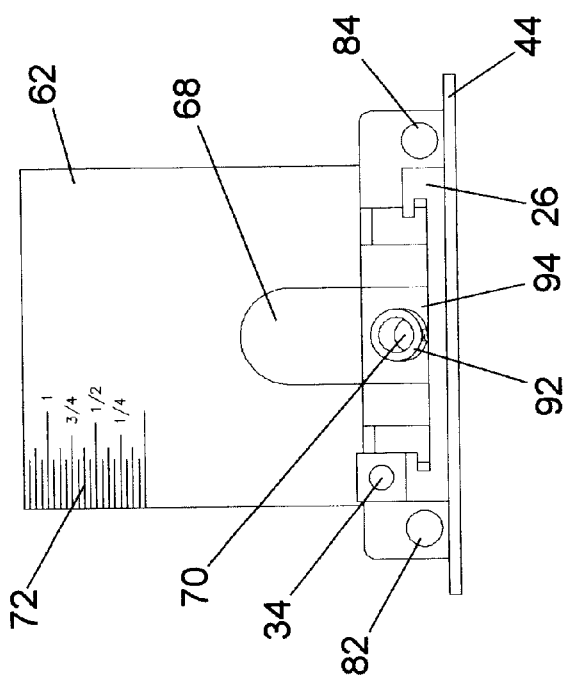
FIG. 9 is a back elevational view of the combination dowel-hole and pocket-hole drill shown in FIG. 1 with the upper fence, lower fence, upper handgrip, and motorized portion of the tool omitted to show the graduated indicator for the upper fence.

The tool is held by a chuck 18 and rotatably driven by a motor within a housing 10 as shown in FIG. 1. The housing 10 also includes a handle 12 extending rearwardly from the motor housing, which has an on/off trigger switch 14 and an electric cord 16 attached. As shown in FIG. 6, the lower part of the assembly forms a shoe 20, the flanges 22, 24 of which slide within grooved ways in the pivoting platform 26. This allows the motor assembly 30 to move forwardly causing the tool to protrude out through an opening (68 for dowel holes and 70 for pocket holes as shown in FIG. 9) in the fence support 62, and rearwardly to retract the tool from the workpiece. The lower part of the housing also has a structure 28 that arrests the forwardly motion of the motor assembly 30 with respect to the pivoting platform 26.

Figure 10:
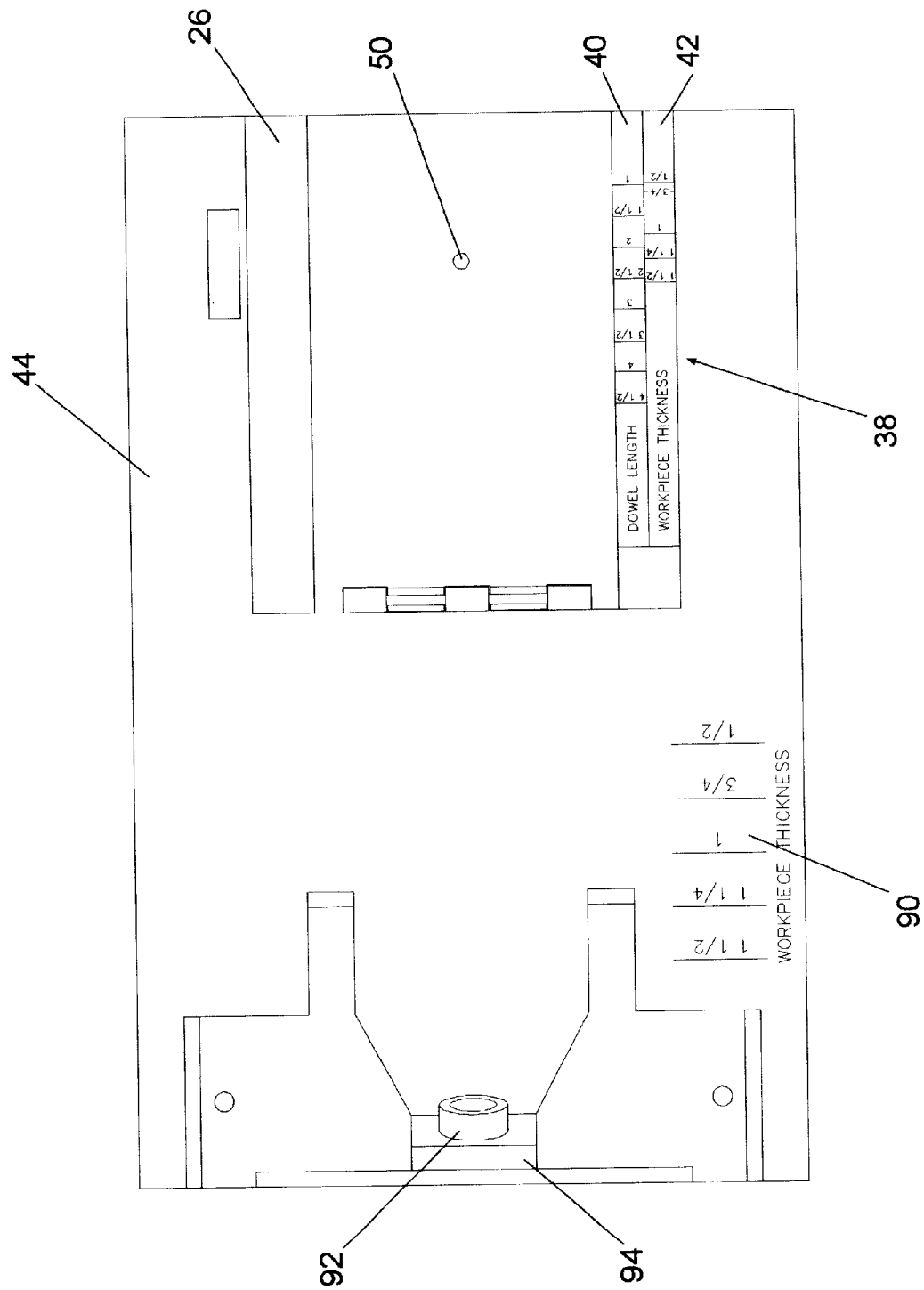
FIG. 10 is an enlarged top plan view of the combination dowel-hole and pocket-hole drill shown in FIG. 1 with the upper fence, lower fence, upper handgrip, and motorized portion of the tool omitted to show the special scale markings for the lower fence and the special scale markings for the plunge stop rod.

The pivoting platform 26 supports a stop rod 32 that can be adjusted to limit the forward travel of the motor assembly 30. The stop rod 32 slides forwardly and rearwardly through a guide 34 (see FIG. 9) in the pivoting platform 26. The clamping knob 36 locks the stop rod 32 in place. As shown in FIG. 10, the special scale markings 38 on the top of the pivoting platform 26 provide indicia for positioning the stop rod 32. In the preferred embodiment, these markings have a dual purpose of assisting the positioning of the stop rod 32 for dowel: hole drilling operations and positioning of the stop rod 32 for pocket hole drilling operations. The upper (with respect to the orientation of FIG. 10 to the text) markings 40 include numerical indicia arranged and configured to indicate the length of the dowel used as a fastener when making a dowel joint. The stop rod 32, when placed at the selected indicia will limit forward travel of the motor assembly 30 such that the tool will penetrate approximately one half the dowel length into the workpiece. Thus, the operator is relieved from performing mathematical calculations, which minimizes error and speeds the process.

The lower (with respect to the orientation of FIG. 10 to the text) markings 42 include numerical indicia arranged and configured to indicate the thickness of the workpiece being drilled when making a pocket-hole joint. The stop rod 32, when placed at the selected indicia, will limit forward travel of the motor assembly 30 such that that tool will penetrate the workpiece to a depth that is advantageous to both the thickness of the workpiece and the length of the mechanical fastener (typically a screw). Thus the operator is relieved from taking accurate measurements and performing mathematical calculations, which minimizes error and speeds the process.

Figure 11:
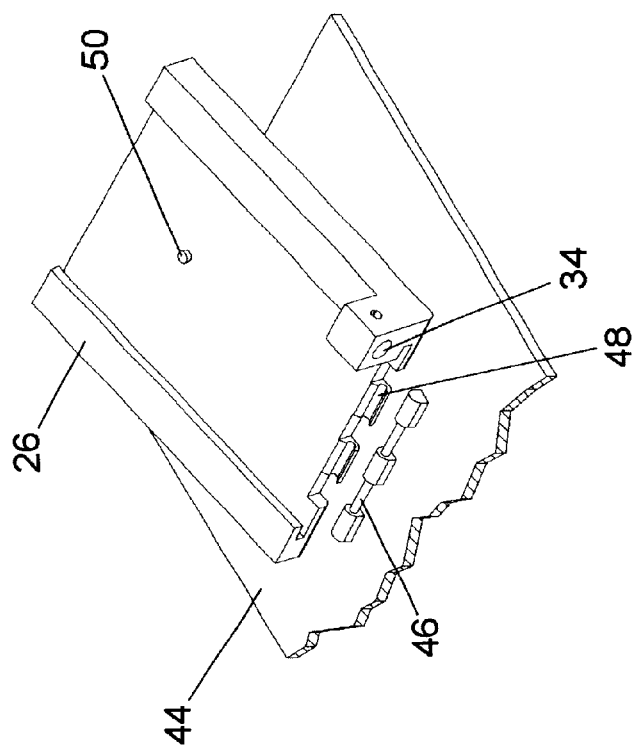
FIG. 11 is a partial top left perspective view of the combination dowel-hole and pocket-hole drill shown in FIG. 1 illustrating features of the pivot joint.

The pivoting platform 26 pivots transversely to the base 44 (as indicated by the broken lines of FIG. 2), ideally around pins 46 supported by the base as shown in FIG. 11. In the preferred embodiment, the hinge joint 48 of the pivoting platform 26 is an open joint with the opening placed advantageously such that when the platform is pivoted in excess of about 45 degrees to the base 44, the platform can be removed from the hinge pins 46 by sliding the platform rearwardly. Conversely, by sliding the pivoting platform 26 forwardly such that the open hinge joint 48 couples with the hinge pins 46 and pivoting the platform to an angle of less than about 45 degrees to the base 44, the hinge joint will interlock the platform to the base. The ability to remove the pivoting platform 26 will ease the cleaning and maintenance of the machine and allow access to the stop pin 50.

Figure 12:
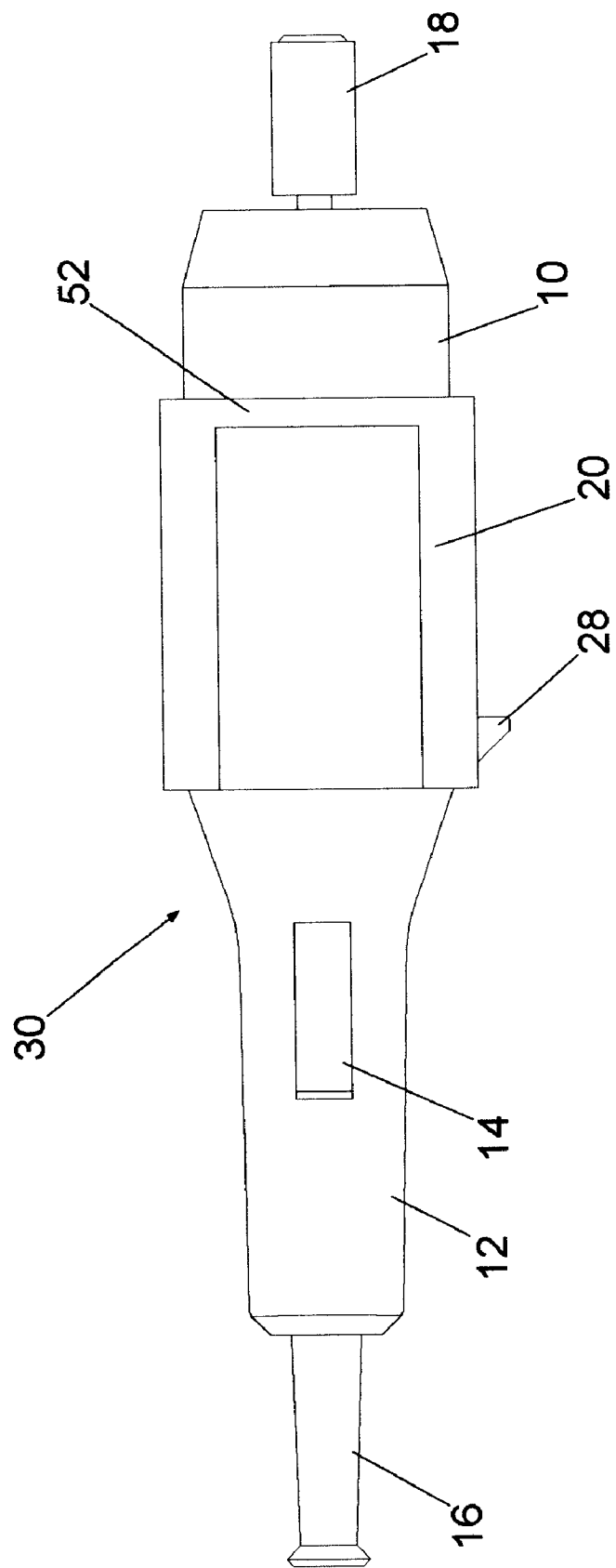
FIG. 12 is a bottom plan view of the motorized portion of the combination dowel-hole and pocket-hole drill shown in FIG. 1 to show the stop cleat.

To prevent the shoe 20 of the motor assembly 30 from sliding rearwardly entirely out of the pivoting platform 26, a stop pin 50 protrudes from the platform to engage a cleat 52, which can be seen in FIG. 12. Advantageously, the stop pin 50 is removable so that the motor assembly 30 can be slid rearward sufficiently to completely remove it from the pivoting platform 26. This will ease the cleaning and maintenance of the machine.

Figure 2:
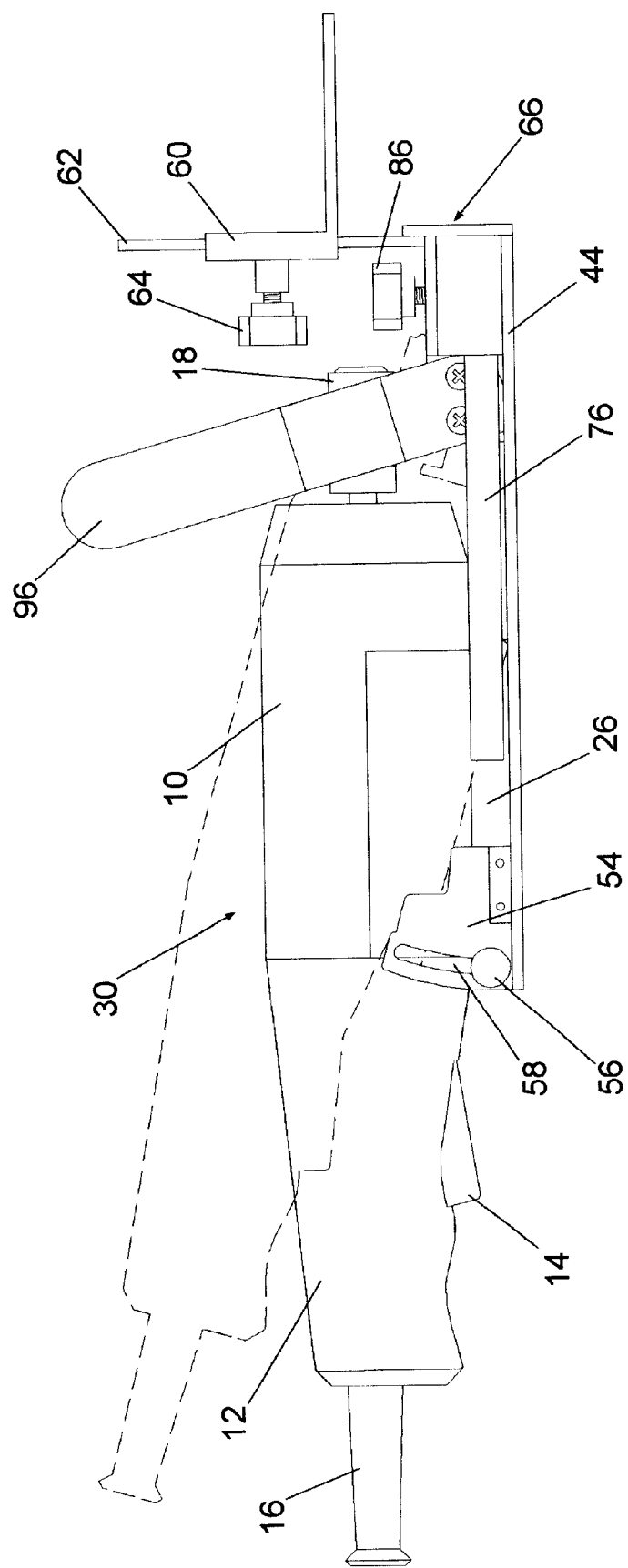
FIG. 2 is a right side elevational view of the combination dowel-hole and pocket-hole drill shown in FIG. 1.

The pivot angle indicator 54 shown in FIG. 2 is used when setting the pivoting platform 26 to an angle advantageous to drilling a dowel hole or a pocket hole. The clamping knob 56 is used to lock the pivoting platform 26 to the pivot angle indicator 54 once the preferred pivot angle is selected. The pivot angle indicator 54 provides an arcuate slot 58 that the screw portion of the clamping knob 56 passes through to lock the position of the pivoting platform 26. Positioning and locking in place the pivoting platform 26 such that it is down and parallel to the base 44 represents a zero degree pivot angle. Positioning and locking in place the pivoting platform 26 such that the top surface of the platform is flush with the top surface of the pivot angle indicator 54 sets the angle to that which is ideally suited to drilling pocket holes.

The preferred fence system consists of two independent fences; an upper fence 60 primarily used for dowel-hole drilling operations, and a lower fence 66 primarily used for pocket-hole drilling operations.

In the preferred embodiment, the upper fence 60 consists of a forwardly portion which has its bottom face perpendicular to the fence support 62 and parallel to the base 44, and the remainder of the structure which is parallel to the fence support and perpendicular to the base. Thus, one portion is perpendicular to the other.

The forwardly portion of the upper fence 60 provides a perpendicular angle between the lower face of the upper fence and the forward face of the fence support 62. In use, these two surfaces contact the workpiece and align the machine to the workpiece such that the resultant dowel hole is perpendicular to the surface in which it was drilled.

The portion of the upper fence 60 that is parallel to the fence support 62 has grooves which engage the fence support and allow the upper fence to slide upwardly and downwardly along the fence support. A clamping knob 64 locks the upper fence 60 to the fence support 62 at the desired height. The fence support 62 also has graduated markings 72 on the back side to aid in correct placement of the upper fence 60. FIG. 9 illustrates approximately evenly spaced indicia 72 for each one-sixteenth inch change in upper fence 60 position. In use, the markings represent the distance from the axial center of the tool to the bottom surface of the upper fence 60. The operator selects a setting by positioning the top surface of the upper fence 60 to be even with the selected marking on the fence support 62 and then locking the upper fence to the fence support with the clamping knob 64. The setting the operator selects corresponds to the distance from the top surface of the workpiece to the center of the dowel hole to be drilled. Thus the operator is relieved from taking accurate measurements of the workpiece and marking the workpiece, which minimizes error and speeds the process.

The lower fence 66 is best illustrated in FIG. 8. In the preferred embodiment, the lower fence 66 consists of two rods 74, 76 connected at the forward ends by a transverse plate 78. The transverse plate 78 is parallel to the fence support 62 and contains an advantageous cutout 80 which allows the pocket hole drill bit to pass safely through during plunge cuts of workpieces whose thickness is less than about three-quarters of an inch. The rods 74, 76 slide forwardly and rearwardly through guides 82, 84 in the base 44 (see FIG. 9) that keep the lower fence 66 parallel to the base. The clamping knob 86 locks the rod 76 to the base 44 once the lower fence 66 is placed in the desired position. Optionally, a second clamping knob can be installed: in the threaded hole 88 in the left rod guide 82 if additional locking power is required.

The base 44 has special scale markings that include numerical indicia 90 (see FIG. 10) arranged and configured to indicate the thickness of the workpiece being drilled when making a pocket-hole joint. Placing the ends of the lower fence rods 74, 76 at the selected indicia will determine the location where the pocket hole drill will enter the workpiece (with respect to the forward edge of the workpiece) which is advantageous to both the thickness of the workpiece and the length of the mechanical fastener. Thus the operator is relieved from taking accurate measurements of the workpiece and performing mathematical calculations, which minimizes error and speeds the process.

When the machine is configured for drilling pocket holes, the lower fence 66 is typically oriented as shown in FIG. 8. This orientation allows the transverse plate 78 to extend below the plane of the base 44 so that as the base is placed on top of the workpiece, the transverse plate can contact the forward face of the workpiece. When the machine is configured for drilling dowel holes, the lower fence 66 may be oriented 180 degrees about the longitudinal axis of the base 44 as shown best in FIGS. 1 and 7. In this position, the transverse plate 78 is flush with the plane of the base 44 and allows the operator to place the machine on flat surface without damaging the lower fence 66.

Figure 3:
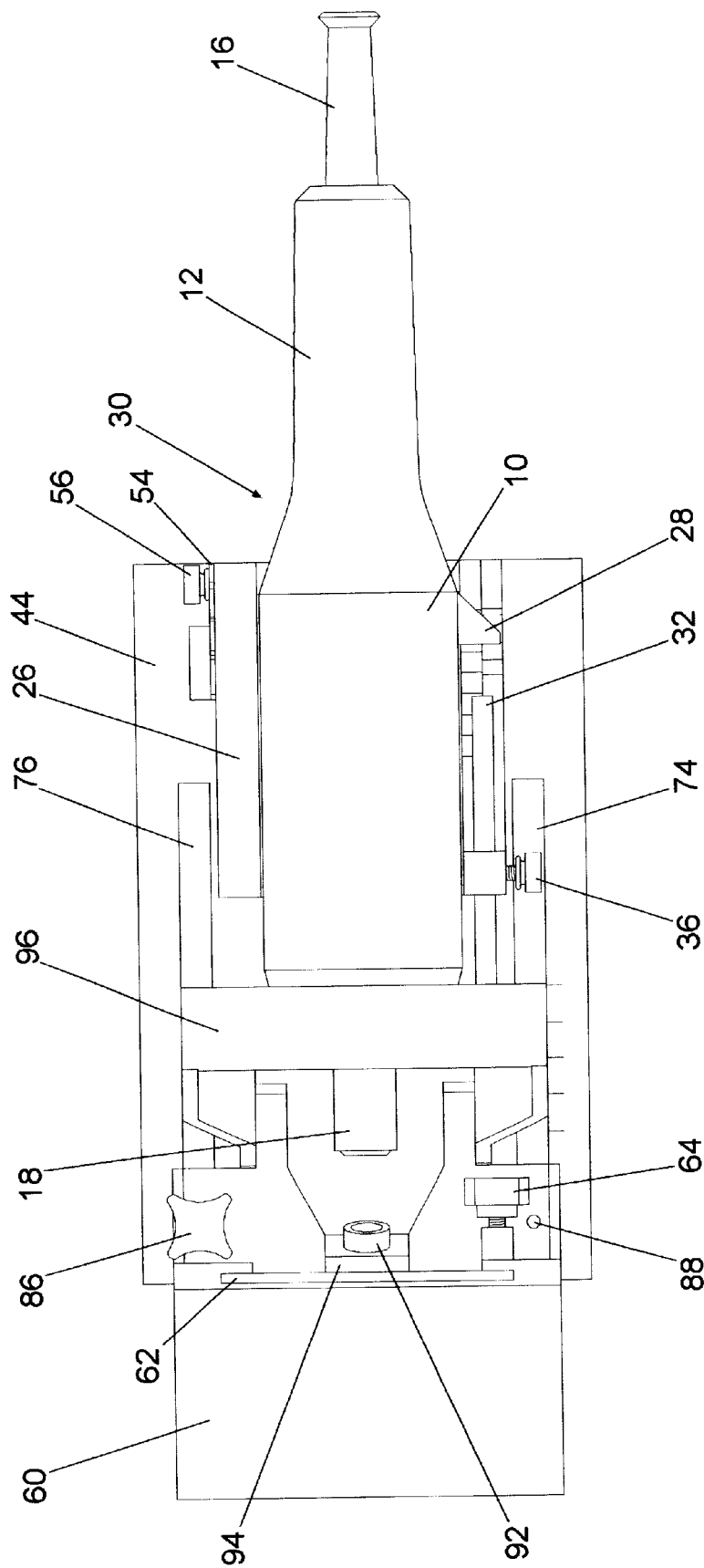
FIG. 3 is a top plan view of the combination dowel-hole and pocket-hole drill shown in FIG. 1.
Figure 4:
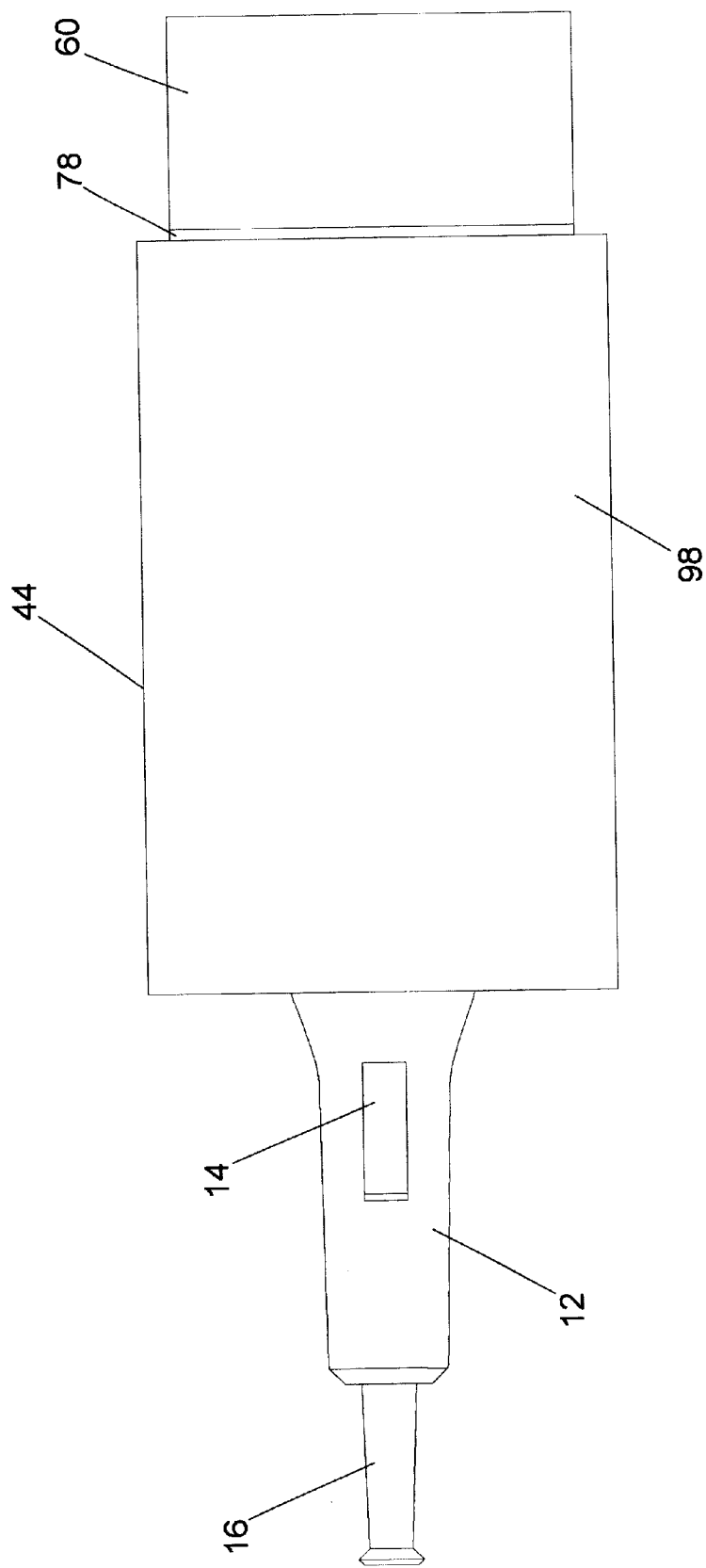
FIG. 4 is a bottom plan view of the combination dowel-hole and pocket-hole drill shown in FIG. 1.

To prevent the pocket hole drill bit from moving vertically or laterally, the preferred embodiment includes a removable guide bushing 92, preferably made of hardened steel, mounted in the forward portion of the base 44. It is best shown in FIGS. 3, 9, and 10. The guide bushing 92 is mounted in a removable block 94 attached to the base 44 and oriented parallel to the axis of the tool. If the operator desires to use a smaller or larger diameter pocket-hole drill bit, the guide bushing 92 can be removed and replaced with another guide bushing with the appropriate inside diameter to support the selected pocket hole drill bit. If the pivoting platform 26 is to be locked into a position other than zero degrees or the position ideally suited for drilling pocket holes, then the block 94 may be removed and replaced with another block that allows the guide bushing to be positioned parallel to the axis of the tool.

In the preferred embodiment, the handgrip 96 is attached to the base 44 near the forward part of the base. It is mounted at an advantageous angle to minimize the likelihood of the operator's hand contacting other surfaces of the machine. It provides the operator with a means for holding the machine against the workpiece during the drilling operation as well as being a convenient carrying handle.

In the preferred embodiment, the bottom surface of the base 44 includes an abrasive 98 (see FIG. 4), which provides stability of the machine against the workpiece. For example, when the grit in the abrasive surface 98 is in contact with the workpiece, it prevents the machine from moving relative to the workpiece.

Figure 13:
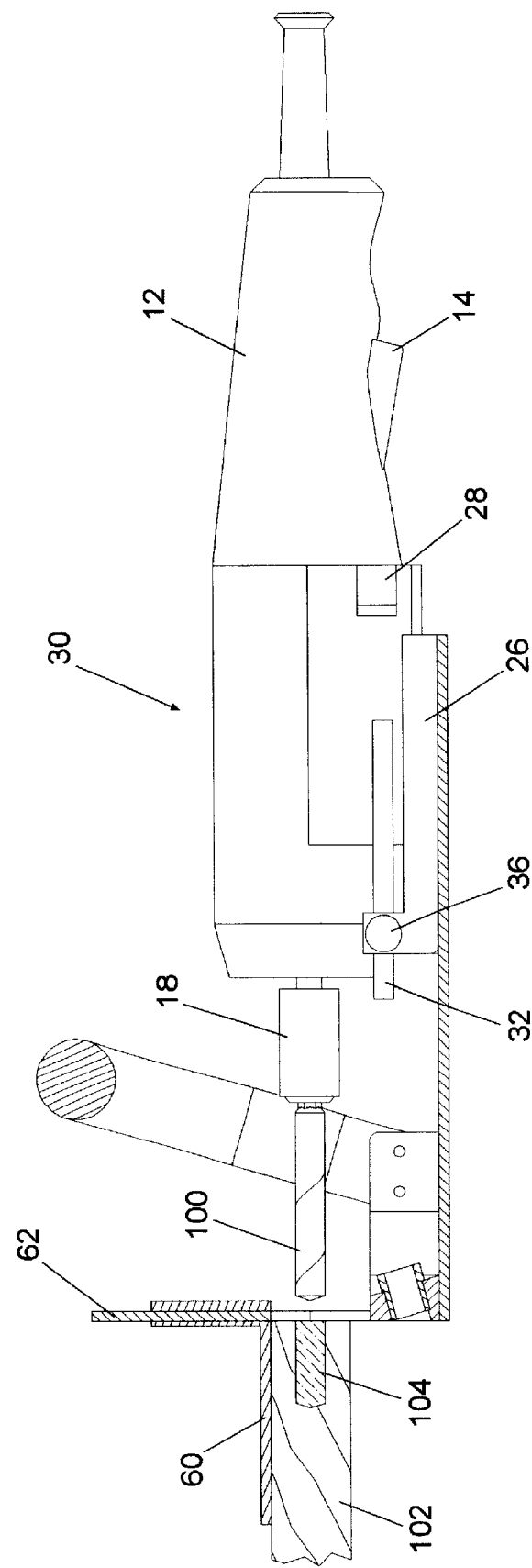
FIG. 13 illustrates features of the combination dowel-hole and pocket-hole drill shown in FIG. 1, with the base, fence system, and workpiece in cross section to illustrate a dowel hole cut.

FIG. 13 illustrates an example of a dowel hole drilling operation. In the preferred embodiment, prior to the dowel drilling operation, the pivoting platform 26 is locked at the zero degree position with the clamping knob 56 and a drill bit 100 of the appropriate diameter and length is locked into the chuck 18. The length of the dowel is determined and the stop rod 32 is positioned at the appropriate "dowel length" indicia 40 of FIG. 10 and locked in place with the clamping knob 36. The upper fence 60 is positioned at the appropriate "dowel hole location" indicia 72 on the fence support 62 indicating how far below the top surface of the workpiece 102 the center of the dowel hole is to be located and locked in place with the clamping knob 64. The machine is placed against the workpiece 102 with the bottom surface of the upper fence 60 resting on the top surface of the workpiece and the forward surface of the fence support 62 against the facing surface of the workpiece. The on/off trigger switch 14 is engaged to apply power to the machine and the motor assembly 30 is plunged forwardly by pushing on the handle 12 of the motor assembly. The tool 100 cuts the workpiece 102 until the stop block structure 28 contacts the stop rod 32 thus forming a dowel hole 104. The tool 100 is extracted from the workpiece 102 by pulling rearwardly on the handle 12 of the motor assembly 30 until the tool is clear of the workpiece and then the on/off trigger switch 14 is released. The operation is repeated on the mating workpiece and typically a dowel and glue are used to join the two workpieces together making a dowel joint.

Figure 14:
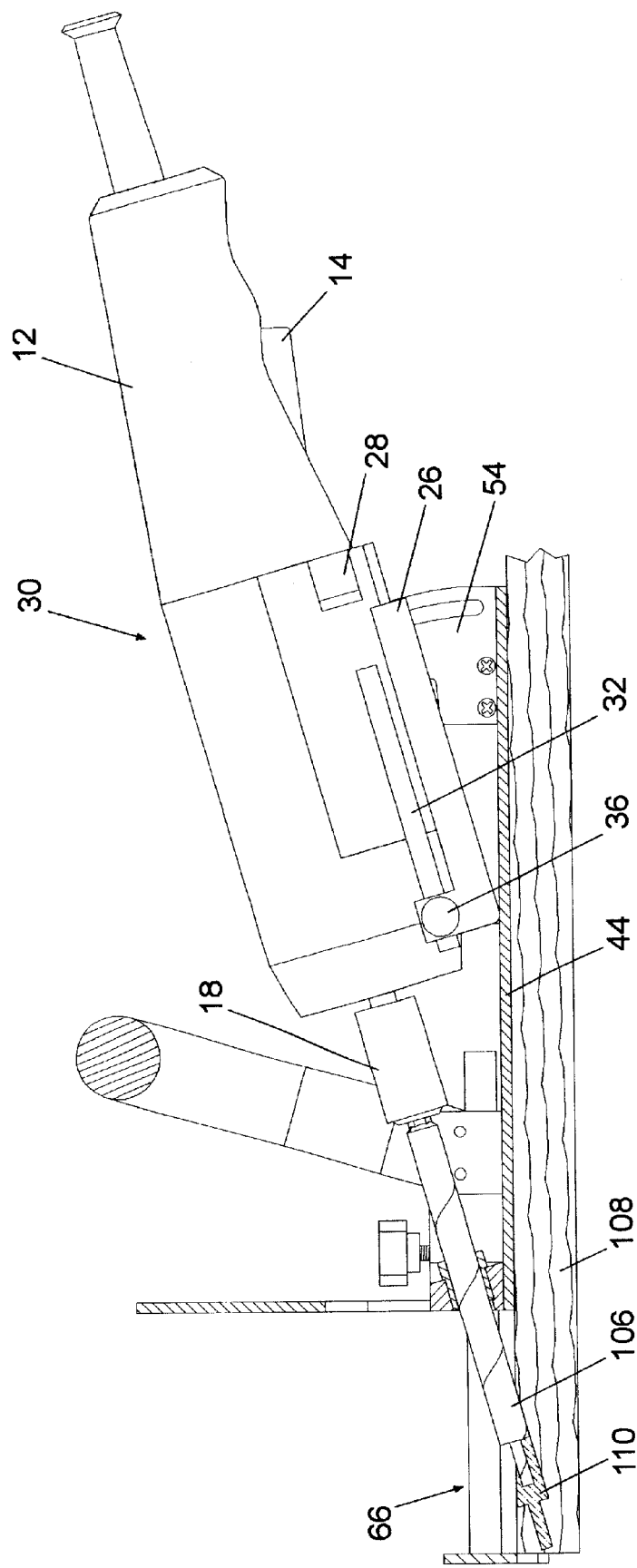
FIG. 14 illustrates features of the combination dowel-hole and pocket-hole drill shown in FIG. 1, with the base, fence system, and workpiece in cross section to illustrate a pocket hole cut.

FIG. 14 illustrates an example of a pocket hole drilling operation. In the preferred embodiment, prior to the pocket hole drilling operation, the pivoting platform 26 is pivoted upwardly so that the top surface of the pivoting platform is flush with the top surface of the pivot angle indicator 54 and locked into position with the clamping knob 56. As is widely known, this angle is about fifteen degrees. A pocket-hole drill bit 106 of the appropriate diameter and length is locked into the chuck 18. The thickness of the workpiece is, determined and the stop rod 32 is positioned at the appropriate pocket hole "workpiece thickness" indicia 42 shown in FIG. 10 and locked in place with the clamping knob 36. The lower fence 66 is positioned at the appropriate pocket hole lower fence positioning indicia 90 on the base 44 also indicating the thickness of the workpiece and locked in place with the clamping knob 86. The machine is placed against the workpiece 108 with the back side, or inside surface, of the lower fence 66 against the forward side of the workpiece and the bottom face of the base 44 against the top surface of the workpiece.

Importantly, upon withdrawal of the drill bit, the workpiece cannot rise up and is held in position by the lower surface of base 44 as shown in FIG. 14. This eliminates the need for "hold down" members 20 of the aforesaid Mastley patent, 6,374,878, which members are "pressed against the workpiece to keep the workpiece from moving upward."; see col. 3, lines 50–60. Such members 20 can make undesirable indentations in soft woods, like the gripping action of prior art devices mentioned in the background section.

The on/off trigger switch 14 is engaged to apply power to the machine and the motor assembly 30 is plunged forwardly by pushing on the handle 12 of the motor assembly. The tool 106 cuts the workpiece 108 until the stop block structure 28 contacts the stop rod 32 thus forming a pocket hole 110. The tool 106 is extracted from the workpiece 108 by pulling rearwardly on the handle 12 of the motor assembly 30 until the tool is clear of the workpiece and then the on/off trigger switch 14 is released. Typically, the workpiece is joined to a mating workpiece with a fastener, such as a screw, and glue making a pocket-hole joint.

The above description of the preferred embodiment is not to be construed as limiting the breadth of the present invention. Modifications and other embodiments of the invention can be made without departing from the spirit and scope of the invention as defined in the appended claims.

I claim:

1. A combined dowel-hole and pocket-hole forming drilling apparatus comprising:
   (a) hole drilling means movable along a drilling means support platform for drilling a hole in a workpiece;
   (b) support platform coupling means for coupling said support platform to a base assembly while selectively maintaining said drilling means parallel with respect to at least a portion of said base assembly for drilling dowel-holes or for maintaining said drilling means at an acute angle with respect to said base assembly for drilling pocket-holes; and
   (c) adjustable travel limiting means for limiting the degree of travel of said hole drilling means with respect to said support platform for setting hole depths; and
   (d) an adjustable dowel-hole workpiece positioning fence coupled to said base assembly for precisely positioning said workpiece with respect to said drilling means for proper location of dowel-holes within said workpiece.

2. A combined dowel-hole and pocket-hole forming drilling apparatus comprising:
   (a) hole drilling means movable along a hole drilling means support platform for drilling a hole in a workpiece;
   (b) support platform coupling means for coupling said hole drilling means support platform to a base assembly while selectively maintaining said drilling means parallel with respect to at least a portion of said base assembly for drilling dowel-holes or for maintaining said drilling means at an acute angle with respect to said base assembly for drilling pocket-holes; and
   (c) adjustable travel limiting means for limiting the degree of travel of said hole drilling means with respect to said support platform for setting hole depths and including;
   (d) a pocket-hole workpiece positioning fence means coupled to said base assembly for holding a workpiece between said pocket-hole workpiece positioning fence means and said base assembly.

3. The drilling apparatus of claim 2 including adjustable pocket-hole parameter input means for drilling different sizes of pocket holes without requiring user calculations including
   (e) pocket-hole depth establishing means for establishing a travel limit of said drilling means with respect to said support platform as a function of workpiece thickness during pocket-hole drilling along with
   (f) pocket-hole position establishing means for establishing drill hole positioning with respect to an edge of a workpiece held between said pocket-hole workpiece positioning fence means and said base assembly, also as a function of workpiece thickness during pocket-hole drilling.

4. The drilling apparatus of claim 3 wherein
   (g) said pocket-hole depth establishing means includes a first workpiece thickness graduated indicator device, indicative of the relative position of the movable hole drilling means with respect to said support platform, and
   (h) wherein said pocket-hole position establishing means includes a second workpiece thickness graduated indicator device, responsive to the position of said pockethole workpiece positioning fence with respect to said base assembly.

5. The drilling apparatus of claim 2 including an adjustable dowel-hole workpiece positioning fence coupled to said base assembly for precisely positioning said workpiece with respect to said drilling means for proper location of dowel-holes within said workpiece.

6. The drilling apparatus of claim 3 including an adjustable dowel-hole workpiece positioning fence coupled to said base assembly for precisely positioning said workpiece with respect to said drilling means for proper location of dowel-holes within said workpiece.

7. The drilling apparatus of claim 4 including an adjustable dowel-hole workpiece positioning fence coupled to said base assembly for precisely positioning said workpiece with respect to said drilling means for proper location of dowel-holes within said workpiece.

8. The drilling apparatus of claim 2 wherein said pocket-hole workpiece positioning fence means is configured for permitting a drill bit to pass completely through the workpiece without striking the fence contacting the workpiece.

9. The drilling apparatus of claim 3 wherein said pocket-hole workpiece positioning fence means is configured for permitting a drill bit to pass completely through the workpiece without striking the fence contacting the workpiece.

10. The drilling apparatus of claim 2 wherein said acute angle is less than twenty degrees.

11. The drilling apparatus of claim 3 wherein said acute angle is less than twenty degrees.

12. The drilling apparatus of claim 4 wherein said acute angle is less than twenty degrees.

13. The drilling apparatus of claim 2 wherein said support platform coupling means is configured to uncouple said adjustable support platform coupling means from said base assembly when a pivot angle therebetween exceeds a predetermined value, for cleaning and maintenance of the drilling apparatus.

14. The drilling apparatus of claim 3 wherein said support platform coupling means is configured to uncouple said adjustable support platform coupling means from said base assembly when a pivot angle therebetween exceeds a predetermined value, for cleaning and maintenance of the drilling apparatus.

15. A pocket-hole forming drilling apparatus having:

(a) hole drilling means movable along a drilling means support platform coupled to a base member for drilling a hole in a workpiece;

(b) means for maintaining said drilling means support platform at an acute angle with respect to said base member for drilling pocket-holes;

(c) travel limiting means for limiting the degree of travel of said hole drilling means with respect to said support platform for setting hole depths;

(d) a pocket-hole workpiece positioning fence means movably coupled to said base member for retaining a workpiece positioned between an inner surface of said pocket-hole workpiece positioning fence and under said base member;

(e) adjustable pocket-hole parameter input means for drilling different sizes of pocket holes without requiring user calculations including (f) pocket-hole depth establishing means for adjusting a travel limit of said drilling means with respect to said support platform as a function of workpiece thickness during pocket-hole drilling along with (g) pocket-hole position establishing means for establishing drill hole positioning with respect to an edge of a workpiece positioned between said pocket-hole workpiece positioning fence and under said base member also as a function of workpiece thickness during pocket-hole drilling.

16. A combined dowel-hole and pocket-hole forming drilling apparatus having:

(a) hole drilling means slidable along a drilling means support platform for drilling a hole in a workpiece;

(b) support platform coupling means for coupling said hole drilling means support platform to a base assembly while selectively maintaining said drilling means parallel with respect to at least a portion of said base assembly for drilling dowel-holes or for maintaining said drilling means at an acute angle with respect to said base assembly for drilling pocket-holes;

(c) travel limiting means for limiting the degree of travel of said hole drilling means with respect to said support platform for setting hole depths;

(d) a pocket-hole workpiece positioning fence movably coupled to said base assembly for retaining a workpiece positioned between an inner surface of said pocket-hole workpiece positioning fence and under said base assembly;

(e) adjustable pocket-hole parameter input means for drilling different sizes of pocket holes without requiring user calculations including (f) pocket-hole depth establishing means for adjusting a travel limit of said drilling means with respect to said support platform as a function of workpiece thickness during pocket-hole drilling along with (g) pocket-hole position establishing means for establishing drill hole positioning with respect to an edge of a workpiece positioned between said pocket-hole workpiece positioning fence and under said base assembly also as a function of workpiece thickness during pocket-hole drilling;

(h) and wherein said pocket-hole depth establishing means includes a first workpiece thickness graduated indicator device, responsive to the relative position of the movable hole drilling means with respect to said support platform;

(i) wherein said pocket-hole position establishing means includes a second workpiece thickness graduated indicator device, responsive to the position of said pocket-hole workpiece positioning fence with respect to said base assembly; and (j) wherein said pocket-hole workpiece positioning fence means is configured for permitting a drill bit carried by said hole drilling means to pass completely through the workpiece without striking the workpiece positioning fence means contacting the workpiece.

17. The drilling apparatus of claim 16 including an adjustable dowel-hole workpiece positioning fence coupled to said base assembly for precisely positioning said workpiece with respect to said drilling means for proper location of dowel-holes within said workpiece.

18. The drilling apparatus of claim 16 wherein said acute angle is less than twenty degrees.

19. The drilling apparatus of claim 16 wherein said adjustable support platform coupling means is configured to uncouple said adjustable support platform coupling means from said base assembly when a pivot angle therebetween exceeds a predetermined value, for cleaning and maintenance of the drilling apparatus.

20. The drilling apparatus of claim 15 wherein said pocket-hole workpiece positioning fence means is configured for permitting a drill bit carried by said hole drilling means to pass completely through the workpiece without striking the workpiece positioning fence means contacting the workpiece.

21. The drilling apparatus of claim 20 wherein said pocket-hole depth establishing means includes a first workpiece thickness graduated indicator device, responsive to the relative position of the movable hole drilling means with respect to said support platform; and wherein said pocket-hole position establishing means includes a second workpiece thickness graduated indicator device, responsive to the position of said pocket-hole workpiece positioning fence with respect to said base assembly.

22. The drilling apparatus of claim 15 wherein said pocket-hole depth establishing means includes a first workpiece thickness graduated indicator device, responsive to the relative position of the movable hole drilling means with respect to said support platform; and wherein said pocket-hole position establishing means includes a second workpiece thickness graduated indicator device, responsive to the position of said pocket-hole workpiece positioning fence with respect to said base assembly.

* * * * *